May 3, 1966 M. BAYLAC 3,249,775
LIQUID-CIRCULATION COOLING DEVICE FOR THE ROTORS OF HIGH-POWER
TURBO-ALTERNATORS ROTATING AT HIGH SPEED
Filed Nov. 19, 1962 4 Sheets-Sheet 4
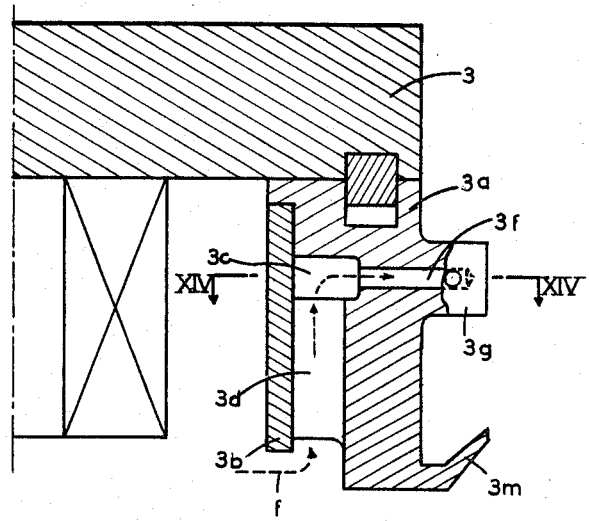
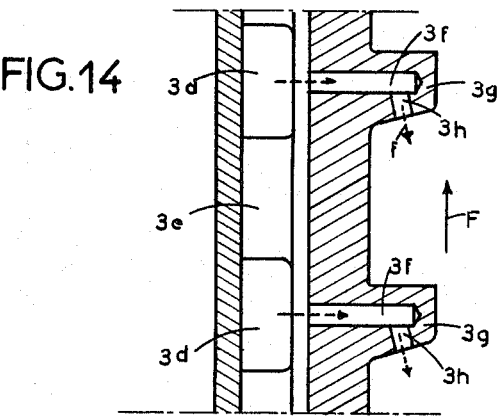
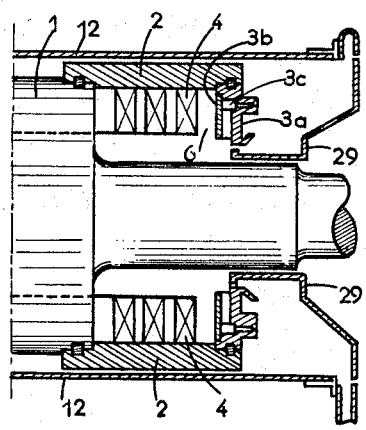

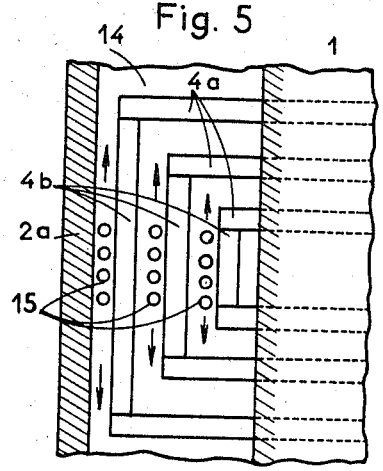
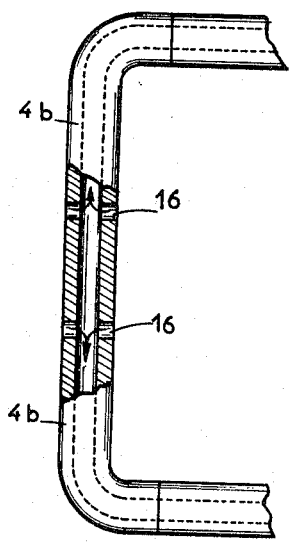
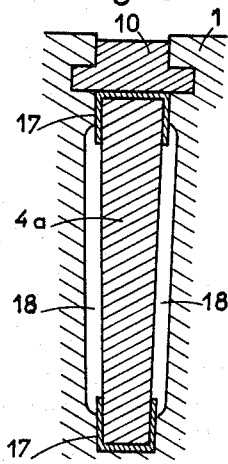
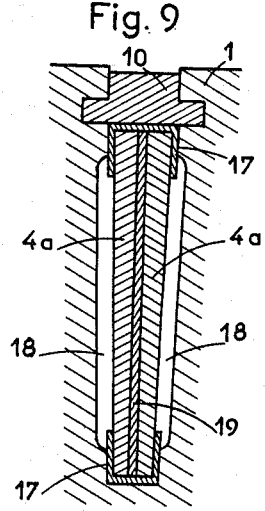
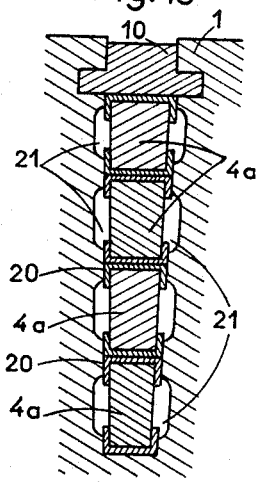
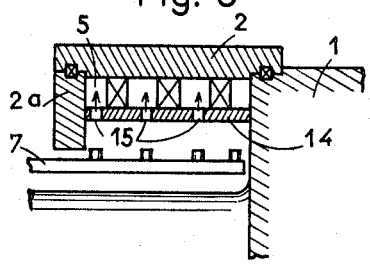

United States Patent Office 3,249,775
Patented May 3, 1966

3,249,775
LIQUID-CIRCULATION COOLING DEVICE FOR THE ROTORS OF HIGH-POWER TURBO-ALTERNATORS ROTATING AT HIGH SPEED
Marcel Baylac, 6 Rue des Bavillons, Puteaux, France
Filed Nov. 19, 1962, Ser. No. 238,405
Claims priority, application France, Nov. 30, 1961, 880,509; Feb. 28, 1962, 889,485
8 Claims. (Cl. 310—54)

The present invention relates to a liquid-circulation cooling device for the rotors of high-power turbo-alternators rotating at high speed.

Various methods of cooling turbo-alternators have been successively used, such in particular as air-circulation cooling, hydrogen-atmosphere cooling, and finally hydrogen-atmosphere cooling using hollow conductors, enabling hydrogen or liquid to be internally circulated in the stator windings, and hydrogen in the rotor windings.

This last solution gives practically unlimited possibilities as regards stators, but if it has enabled possibilities as regards rotors to be widened to a large extent, it nevertheless remains a fact that the latter now constitutes the element which limits the power capable of being imparted to alternators.

It has been possible to push up power limits by seeking those electrical characteristics of the machines which enable rotor loading to be reduced with respect to stator loading, in particular an increase in power factor and a reduction in short-circuit ratio, to the extent that users have been prepared to accept these particular characteristics.

Likewise, it has already been proposed to cool rotors by circulating a liquid, water or oil, under pressure, such a method of cooling being capable of giving a large reduction in rotor dimensions, and consequently in the overall dimensions of alternators. No practical use has been made of this solution, at least as regards high powers, because of the technological difficulties inherent in the techniques used.

It has thus been proposed to circulate the liquid coolant in the solid metal portion of the rotor. This procedure involves the disadvantage of setting up large temperature transfers through the insulating sheathing of the conductors. Moreover, the liquid is bound to enter and leave via the bore in the shaft, which is already used to pass the conductors which feed the windings; machining ducts in the solid portion of the rotor is a difficult operation, the more so since there must be a completely fluid-tight seal at pressures which may reach considerable values as a function of the diameter and rotational speed of the rotor.

It has moreover been proposed to make the rotor windings of hollow conductors in which the liquid is circulated: the internal pressure in the conductors, due solely to centrifugal force, would be of the same order as in the solution previously mentioned, and there would therefore be problems as regards resistance to pressure and sealing over the whole length of the conductor, which is bound to comprise a large number of butt packings between its elements. If a packing bursts, the winding can be only partially filled, giving a large degree of unbalance, which may lead to the rotor fracturing. Moreover, since the liquid is hotter upon emerging from a pole than upon entering it, there are diametrically opposed zones of different temperature, and the rotor therefore acquires unbalance because of thermal deformation of its solid portion.

In the device to which the present invention relates, the aforementioned disadvantages of liquid-circulation rotor cooling are eliminated; in particular, the new device confers freedom from any sealing problem, avoids drilling ducts in the solid portion of the rotor, gives equal temperature distribution over the whole periphery of the rotor, and preserves the conductors from the harmful effects of liquid pressure set up by centrifugal force.

According to the invention, the rotor is surrounded in fluid-tight fashion by an insulating sleeve inserted into the gap which separates the stator from the rotor, and two annular chambers on either side of the body of the rotor, whereof the peripheral walls are formed by the collars surrounding those parts of the winding outside the rotor, communicate with one another by way of ducts arranged in and (or) round each of the conductors disposed in the slots of the rotor, one of the said chambers, of smaller internal diameter than the other chamber, being fed by at least one fixed injector with liquid at low pressure, forced circulation of liquid from the said chamber to the other being produced by the excess pressure set up by centrifugal force.

One particular form of embodiment of a cooling device according to the invention, together with some variants in this form of embodiment, are illustrated more or less diagrammatically in the appended drawing and described hereinafter by way of example.

In the drawing:

FIGURES 5 and 6 are partial views taken from FIGURES 2 and 1, showing a variant in the liquid inlet;

FIGURE 7 shows a hollow conductor which makes a connection between two slot conductors, on a still larger scale;

FIGURES 8, 9 and 10 are transverse sections through one slot, showing some communicating ducts arranged round the conductors;

FIGURE 12 is a section similar to that in FIGURE 1, showing a variant of embodiment of the liquid-outlet chamber;

FIGURE 13 is a view taken from FIGURE 12, on a larger scale; and

FIGURE 14 is a developed view, sectioned along XIV—XIV in FIGURE 13.

Figure 1:
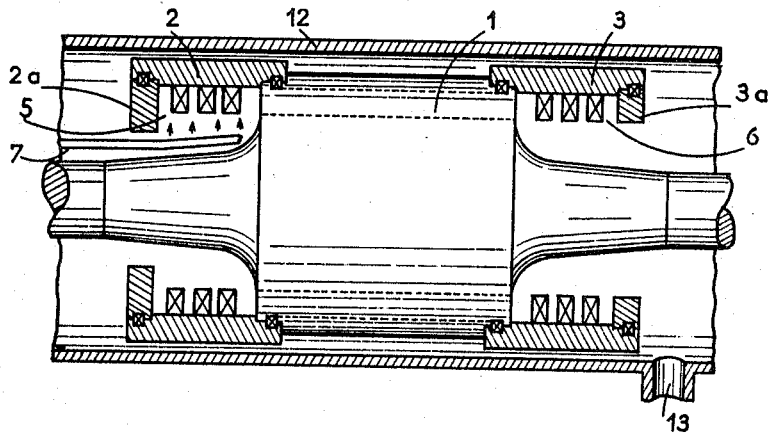
FIGURE 1 is a diagrammatic view of the rotor and its cooling device.

FIGURE 1 shows the steel body 1 of the rotor, fitted with two end collars 2 and 3 surrounding those parts of the winding outside the body of the rotor.

Figure 2:
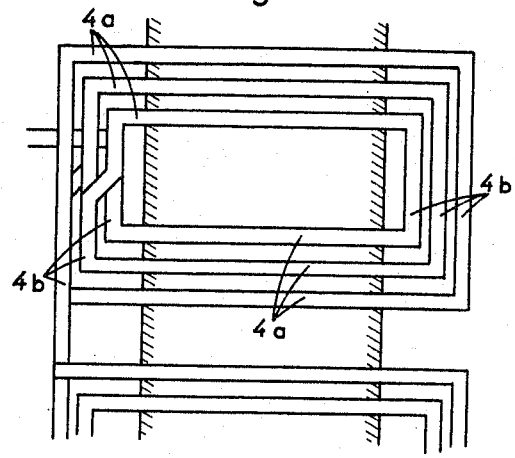
FIGURE 2 is a diagrammatic view of the winding on one pole of the rotor.

The winding may be of any type. FIGURE 2 illustrates, by way of example, a winding comprising three concentric coils per pole, connected in series. Each coil comprises two straight elements 4a, embedded in the iron of the rotor and extending beneath the collars 2 and 3; they are joined to one another at their ends by curved elements 4b. There may be any number of conductors per coil.

According to the invention, there are two annular chambers 5 and 6, on either side of the rotor 1 respectively and inside the collars 2 and 3. For this purpose, the collars 2 and 3 are fitted with annular partitions 2a and 3a, the internal diameter of the partition 2a being smaller than that of the partition 3a. The chamber 5, of larger annular cross-section than the chamber 6, is fed with liquid at low pressure by a fixed injector 7 equipped with a plurality of flow orifices orientated towards the periphery of the chamber.

The two annular chambers 5 and 6 communicate with one another.

In a first form of embodiment according to the invention, communication between the two chambers 5 and 6 is via ducts in the conductors which form the straight elements 4a of the rotor coils.

Figure 3:
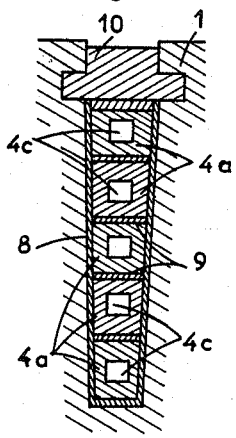
FIGURE 3 is a transverse section through one slot of the rotor on a larger scale.
Figure 4:
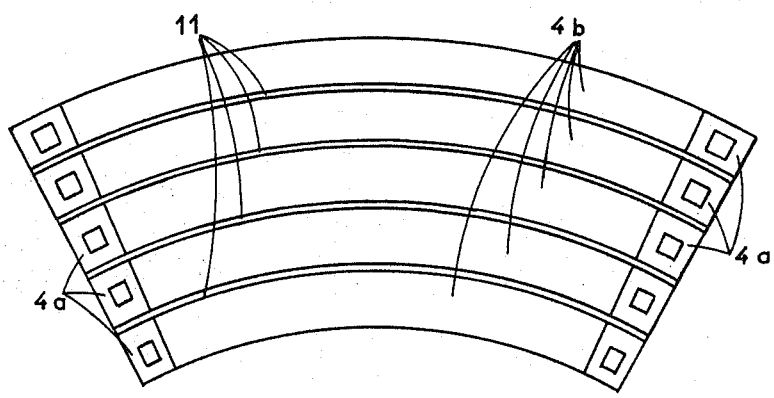
FIGURE 4 is an end view of the winding on one pole of the rotor.

FIGURE 3 illustrates, sectioned and on a larger scale, a straight element 4a of a five-conductor coil of trapezoid cross-section; these conductors are disposed in known manner in a slot in the body of the rotor 1, with the interposition of a U-shaped insulator 8 and intermediate insulators 9, the slot being closed by a wedge 10. In each of the conductors there is a duct 4c of rectangular cross-section; the two straight elements 4a of a coil are joined to one another at their ends by curved elements 4b made up of solid conductors brazed to the hollow conductors and separated by insulators 11 (FIGURE 4).

The rotor thus equipped is surrounded by a rigid insulating sleeve 12 (FIGURE 1) such as may be found in high power machines having a large gap between the rotor and stator. This sleeve, which is fixed in fluid-tight fashion to the cheeks of the alternator, separates the rotor in fluid-tight fashion from the stator; it comprises a liquid-coolant discharge pipe 13 on the side of the annular chamber 6.

The rotor is cooled in the following manner. When the rotor is rotating at normal speed, the liquid coolant admitted by the injector 7 tends to fill the annular chamber 5 under the action of centrifugal force. The pressure set up in the chamber 5 compels the liquid to flow to the annular chamber 6, whence it escapes when the volume of liquid defined by the annular partition 3a is reached. The annular cross-section of the chamber 5 being greater than that of the chamber 6, the pressure at the inlet to the ducts in the hollow conductors increases up to the instant when the chamber 5 is filled with liquid, and thus reaches a higher value than that of the counter-pressure at the outlet of the ducts, resulting in forced circulation of liquid from the chamber 5 to the chamber 6.

The liquid escaping from the chamber 6 and any surplus from the liquid fed to the chamber 5 are picked up by the sleeve 12 and discharged via the pipe 13.

Liquid is circulated through the rotor in absolutely symmetrical fashion, in direct contact with the conductors. Those parts of the hollow conductors which form straight elements 4a outside the rotor are subjected to the same pressures externally and internally, which avoids any danger of these conductors bursting. Any leaks which may occur where the collars are supported or under the slot-wedges are unimportant since they are picked up by the sleeve 12.

The solid conductors which form the curved elements 4b of the coils are cooled by contact with the liquid in the chambers 5 and 6. The cooling imparted to them may be improved by making them of relatively wide cross-section, so as to reduce overall losses by the Joule effect and reduce the degree to which they are heated.

In a second form of embodiment according to the invention, contact between the liquid and the curved elements 4b of the coils is improved by forced circulation of the liquid with respect to these curved elements.

For this purpose, as shown in FIGURES 5 and 6, a cylindrical screen 14 is brought to bear against the internal faces of the curved elements 4b. This screen comprises orifices 15 opposite to the spaces between the curved elements 4b and in the vicinity of the axis of the corresponding pole, through which orifices liquid under centrifugal force is compelled to enter the peripheral portion of the chamber 5, and through which it escapes from the peripheral portion of the chamber 6. As it moves between the orifices 15 and the ends of the straight elements 4a (FIGURE 5), the liquid cools the curved elements 4b in the chamber 5; the same result is obtained in the chamber 6 by moving liquid in the opposite direction.

In a third form of embodiment according to the invention, cooling of the curved elements 4b is improved by adopting hollow conductors to form these elements.

Such a hollow conductor is illustrated on a larger scale in FIGURE 7, which shows, in partially cut-away fashion, a duct 4d arranged in the conductor 4b and fed by four orifices 16 in opposed pairs situated in the vicinity of the axis of the corresponding pole.

In a fourth form of embodiment according to the invention, liquid circulation between the two annular chambers is no longer by means of hollow conductors, but by ducts in the body of the rotor 1, along solid conductors, as shown in FIGURES 8, 9 and 10.

FIGURE 8 illustrates a section through a slot in which is disposed a straight element 4a of a coil, in the form of a single solid conductor insulated by means of two U-shaped insulators 17. The enclosure is opened out on either side of the solid conductor so as to form two ducts 18.

FIGURE 9 illustrates an arrangement similar to that in FIGURE 8, the straight element 4a being made up of two solid conductors separated by an insulator 19.

FIGURE 10 illustrates an arrangement in which the straight element 4a of a coil is made up of four solid conductors insulated by means of insulators 20. The slot is opened out so as to form ducts 21 on either side of each of the conductors.

In the case of conductors in the body of the rotor, the curved elements 4b of the coils are cooled in the manner illustrated in FIGURES 5 and 6, with the aid of screens 14 comprising orifices 15.

Figure 11:
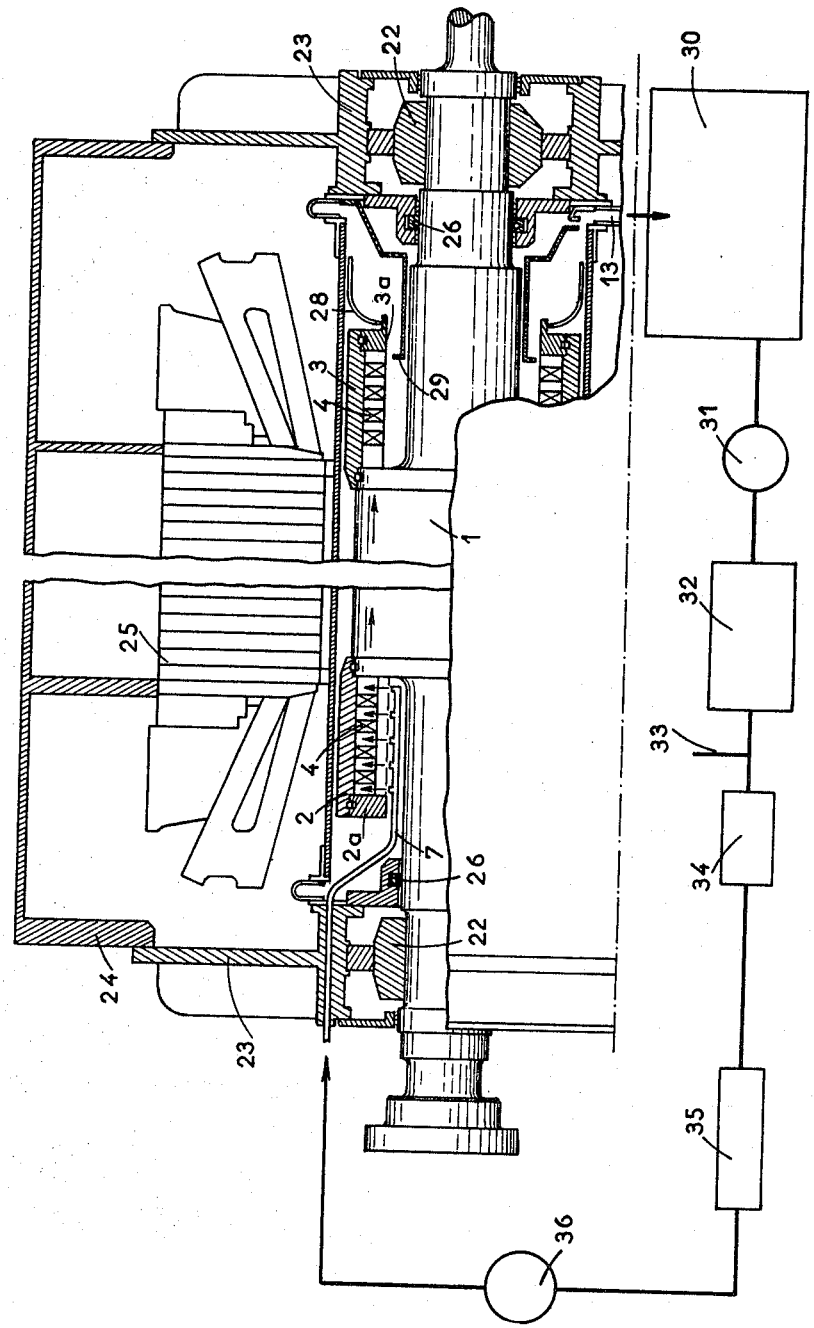
FIGURE 11 is an overall view of a turbo-alternator in longitudinal section, and of the liquid-coolant circuit.

The liquid-coolant circuit is diagrammatically illustrated in FIGURE 11, which moreover shows the general arrangement of a turbo-alternator cooled in accordance with the invention.

The rotor 1, equipped with two collars 2 and 3, annular partitions 2a and 3a, and windings 4, is supported in two bearings 22 mounted in the cheeks 23 fixed to the frame 24 of the stator 25. Packings 26 make the shaft egress point fluid-tight. The insulating sleeve 12, centered in the stator, is fixed by way of elastic bellows 27 to the cheeks 23.

The liquid-injector 7 is fitted to one of the checks 23, on the side of the annular chamber 5. Liquid emerging from the annular chamber 6 encounters two screens 28 and 29, intended to absorb its momentum and direct it to the discharge pipe 13.

The liquid circuit essentially comprises a tank 30 intended to receive the liquid discharged by the pipe 13, a liquid-recycling pump 31, a cooler 32, a liquid inlet 33 intended to maintain a definite level in the tank 30, a filter 34, and appliance 35 for demineralizing and de-ionizing the liquid, and an appliance 36 for checking the resistivity of the liquid.

In the case of very high-power machines rotating at high speed, the circumferential velocity of the liquid escaping via the central aperture in the partition 3a bounding the second chamber may reach a very high value, leading on the one hand to a loss of kinetic energy dissipated in the fixed envelope 29 which receives the liquid, and on the other hand to the risk of an emulsion being formed because of the liquid being agitated, with the result that the liquid may not flow normally out of the alternator via its discharge orifices.

The form of embodiment illustrated in FIGURES 12, 13 and 14 enables the harmful effects of the high circumferential velocities imparted to the liquid to be greatly reduced and even eliminated.

FIGURES 12 and 13 show that the partition 3a comprises a circular groove 3c, which communicates with the interior of the element 3a via a plurality of radial countersunk holes 3d, whereof the profile is illustrated in FIGURE 3. The ribs 3e separating the countersunk holes 3d from the supporting base for the screen 3b, which is centered in the element 3a and fixed to the latter with the aid of screws or bolts not illustrated.

After the screen 3b has been placed in position, the countersunk holes 3d constitute an equal number of radial ducts, and the circular groove 3d constitutes a circular chamber.

Blind ducts 3f, each situated in the radial plane of symmetry of one of the ducts 3d, open out into the chamber 3c, and extend into a projection 3g on the element 3a. Each of the ducts 3f communicates with the exterior of the rotor body 1 via an oblique duct 3h, which is so drilled as to be orientated in the opposite direction to the direction of rotation, the latter being designated by the arrow F in FIGURE 14.

The liquid which has passed axially through the body of the rotor and cooled the windings flows as follows:

As soon as the ring of liquid subjected to the action of centrifugal force has reached an internal diameter smaller than the internal diameter of the screen 3b, it is axially retained by the element 3a, and the liquid, under increasing action from centrifugal force, flows through the radial ducts 3d to the chamber 3c, which it fills at increased pressure, and whence it escapes via the ducts 3f and 3h. This liquid path is designated by the broken arrows f in FIGURES 13 and 14.

Suitable choice of the number of ducts 3f and 3h, and adjustment of the outlet cross-section of the ducts 3h, as a function of the delivery of liquid and for a definite rotational speed can impart to the liquid an outlet velocity which will remain very close to the corresponding peripheral velocity.

Losses of kinetic energy are thus reduced to zero, or become very small, and the reduced value of any possible residual velocities in the liquid eliminates any risk of emulsion.

A deflector 3m, fast with the element 3a, may be provided in order to encourage the liquid to discharge towards the screen 29 (FIGURE 12).

The profile given to the ribs 3e separating the ducts 3d, for example a helical profile, can encourage the liquid to flow centrifugally to the circular groove 3c.

In the foregoing, the usual wedges for locking the various coils of a winding to one another and to the rotor have been neglected; these wedges may be provided with the apertures required not to hinder circulation of the liquid.

Cooling the rotor by liquid circulation does not prevent a gas, preferably hydrogen, from being admitted to the interior of the fluid-tight sleeve surrounding the rotor for the purpose of reducing losses due to agitation. This gas does not participate in cooling, and would thus not require any cooling or circulating device, since the pressure may be scarcely any greater than atmospheric pressure.

The liquid coolant may be either oil or water, as customarily used for similar purposes in transformers or in stator windings in turbo-alternators, with the usual precautions dictated by the nature of the liquid used.

For cooling the stator, recourse may be had to any of those known methods which are more particularly applicable to turbo-alternators in which the stator and the rotor are separated by a fluid-tight sleeve.

The device as it has just been described could naturally be modified or supplemented by any useful accessory without for that reason departing from the scope of the invention.

What I claim is:

1. Liquid circulation cooling device for the rotor of a turbo-alternator comprising a rotor, windings in and outside of the rotor, a stator, a gap between the rotor and the stator, and an insulating sleeve surrounding the rotor in the gap, forming a fluid type barrier, an annular chamber on each side of the rotor, collars fixed to the rotor forming peripheral walls surrounding the windings outside the rotor, ducts between the chambers for each conductor of the windings in the rotor, one of the chambers being of smaller internal diameter than the other chamber, and at least one fixed injector feeding liquid at low pressure to the smaller diameter chamber whereby forced circulation of liquid from the smaller diameter chamber to the other chamber is produced by pressure established by centrifugal force.

2. Cooling device as described in claim 1, the ducts being disposed within the conductors of the windings in the rotor.

3. Cooling device as described in claim 2, the windings outside the rotor being curved and the ducts extending into the curved conductors of the windings.

4. Cooling device as described in claim 1, the ducts being formed in the rotor on each side of the conductors of the windings in the rotor.

5. Cooling device as described in claim 1 including a screen in each of the chambers and communication openings in the screens whereby liquid circulation is obtained along the windings outside the rotors.

6. Cooling device as described in claim 1 including an annular partition axially determining the larger diameter chamber, a circular chamber in the periphery of the partition, a plurality of radial ducts in the partition connecting the circular chamber to the larger diameter chamber, a plurality of horizontal ducts in the partition connecting to the circular chamber and opening through the partition away from the rotor and outlet orifices for the ducts oriented opposite to the direction of rotor rotation and having a flow-cross section corresponding to an outlet liquid velocity substantially equal to the peripheral liquid inlet velocity of the ducts.

7. Cooling device as described in claim 6 including inlets for the radial ducts radially disposed within the annular partition.

8. Cooling device as described in claim 1, the liquid which is passed through the rotor being contained within the sleeve and a pipe opening into the sleeve and discharging outside the turbo-alternator for discharge of the liquid.

References Cited by the Examiner
UNITED STATES PATENTS
2,369,795   2/1945   Planiol et al. _____ 60—39.66

ORIS L. RADER, *Primary Examiner.*

CHARLES SUKALO, *Examiner.*